US012151280B2

(12) United States Patent
Kato et al.

(10) Patent No.: US 12,151,280 B2
(45) Date of Patent: Nov. 26, 2024

(54) HEAT EXCHANGER AND METHOD FOR MANUFACTURING HEAT EXCHANGER

(71) Applicant: Marelli Corporation, Saitama (JP)

(72) Inventors: Masahiro Kato, Saitama (JP); Takashi Kaneda, Saitama (JP); Fumihiro Kawashima, Saitama (JP)

(73) Assignee: Marelli Corporation, Saitama (JP)

( * ) Notice: Subject to any disclaimer, the term of this patent is extended or adjusted under 35 U.S.C. 154(b) by 257 days.

(21) Appl. No.: 17/772,648

(22) PCT Filed: Oct. 29, 2020

(86) PCT No.: PCT/JP2020/040678
§ 371 (c)(1),
(2) Date: Apr. 28, 2022

(87) PCT Pub. No.: WO2021/085548
PCT Pub. Date: May 6, 2021

(65) Prior Publication Data
US 2023/0035116 A1    Feb. 2, 2023

(30) Foreign Application Priority Data

Oct. 31, 2019    (JP) .................................. 2019-199113

(51) Int. Cl.
*F28F 9/013*    (2006.01)
*B21D 53/08*    (2006.01)
(Continued)

(52) U.S. Cl.
CPC ............ *B21D 53/08* (2013.01); *B23K 1/0012* (2013.01); *F28D 1/05316* (2013.01);
(Continued)

(58) Field of Classification Search
CPC ........ F28F 2225/04; F28F 9/013; F28D 1/053
See application file for complete search history.

(56) References Cited

U.S. PATENT DOCUMENTS

| 2004/0050540 A1 | 3/2004 | Kato et al. |
| 2005/0199379 A1 | 9/2005 | Kimura et al. |
(Continued)

FOREIGN PATENT DOCUMENTS

| CN | 205940258 U | 2/2017 |
| CN | 207763531 U * | 8/2018 |
(Continued)

OTHER PUBLICATIONS

Thin flow header to distribute feed water for compact heat exchanger, Experimental Thermal and Fluid Science, 28 (2004) 201-207 (Year: 2004).*

*Primary Examiner* — Eric S Ruppert
(74) *Attorney, Agent, or Firm* — Young Basile Hanlon & MacFarlane, P.C.

(57) ABSTRACT

A heat exchanger includes: flat tubes; a plate attached to the flat tubes; a medium tank configured to form a medium flow path by covering openings of flat tubes; and a reinforcing member to reinforce the openings. The reinforcing member includes a pair of leg portions and a connection portion that connects the leg portions. An insertion amount of the leg portions into the opening is larger than a sum of a gap between the connection portion and an inner surface and a length from the opening to a position corresponding to a brazed portion between the flat tube and the plate, or when a protruding portion protruding in a direction opposite an insertion direction is provided in the connection portion, larger than a sum of a gap between the protruding portion and the inner surface and a length from the opening to the position corresponding to the brazed portion.

7 Claims, 4 Drawing Sheets

(51) Int. Cl.
  *B23K 1/00* (2006.01)
  *F28D 1/053* (2006.01)
  *F28F 9/02* (2006.01)

(52) U.S. Cl.
  CPC ............ *F28F 9/013* (2013.01); *F28F 9/0246* (2013.01); *F28F 2225/04* (2013.01); *F28F 2275/04* (2013.01)

(56) References Cited

U.S. PATENT DOCUMENTS

| | | |
|---|---|---|
| 2007/0062215 A1 | 3/2007 | Yamazaki et al. |
| 2007/0131404 A1 | 6/2007 | Overbury et al. |
| 2007/0160868 A1* | 7/2007 | Watanabe ............ F28F 21/089 428/654 |
| 2019/0072341 A1 | 3/2019 | Singh et al. |

FOREIGN PATENT DOCUMENTS

| | | |
|---|---|---|
| DE | 19935688 A1 | 2/2001 |
| JP | 2002-213893 A | 7/2002 |
| JP | 2005-221127 A | 8/2005 |
| JP | 2007-085616 A | 4/2007 |
| JP | 2007-163124 A | 6/2007 |
| JP | 2009-299924 A | 12/2009 |
| JP | 2011-038655 A | 2/2011 |
| JP | 2012-097916 A | 5/2012 |
| JP | 5706665 B2 | 4/2015 |
| JP | 2019-045134 A | 3/2019 |
| JP | 2019-095094 A | 6/2019 |
| KR | 20130022469 A * | 3/2013 |

\* cited by examiner

HEAT EXCHANGER AND METHOD FOR MANUFACTURING HEAT EXCHANGER

CROSS-REFERENCE TO RELATED APPLICATION(S)

This application claims priority to Japanese Patent Application No. 2019-199113, filed Oct. 31, 2019, the entire disclosure of which is hereby incorporated by reference.

TECHNICAL FIELD

The present invention relates to a heat exchanger and a method for manufacturing the heat exchanger.

BACKGROUND

A heat exchanger configured to cool engine cooling water flowing through a large number of flat tubes by the outside air taken in from the outside of an engine is known. In such a heat exchanger, particularly when the outside air temperature is low, hot water, which has a significantly higher temperature than the low-temperature outside air, flowing into the heat exchanger rapidly flows into the flat tubes of the heat exchanger.

In the heat exchanger, since a rigidity of the flat tubes is lower than a rigidity of a plate through which the flat tubes are inserted, there is a tendency that thermal strain is accumulated in the flat tubes having the low rigidity in the vicinity of brazed portions between the outer surfaces of the flat tubes and edge portions of insertion holes of the flat tubes formed in the plate. Regarding this, a reinforcing structure for reinforcing the flat tubes in the vicinity of the brazed portions has been proposed (see JP5706665B).

SUMMARY

However, in the reinforcing structure described in JP5706665B, it is not possible to visually confirm detachment or the like of a reinforcing member after brazing in a procedure of assembling a tank after the reinforcing member is inserted into an opening of the flat tube, and thus it is required to pay attention such that the reinforcing member does not detach from the opening. In addition, even at a time of brazing and joining after assembly, the reinforcing member may be misaligned due to vibration caused by a manufacturing process, thickness reduction due to melting of a brazing material, and the like. Therefore, it has hindered the improvement in work efficiency and the improvement in product yield in manufacturing the heat exchanger.

An object of the present invention is to improve work efficiency and yield in manufacturing a heat exchanger.

According to an aspect of the present invention, a heat exchanger includes: a plurality of flat tubes configured to form a medium flow path; a plate attached to an end portion of each of the plurality of flat tubes, the plate having a plurality of insertion holes into which the plurality of flat tubes are inserted, the plurality of insertion holes having shapes the same as cross-sectional shapes of the plurality of flat tubes; a medium tank configured to form a medium flow path by covering openings of the plurality of flat tubes inserted into the insertion holes; and a reinforcing member configured to reinforce the openings. The plurality of flat tubes, the plate, the medium tank, and the reinforcing member are connected by a brazing material. The reinforcing member includes at least a pair of leg portions and a connection portion that connects the leg portions, and is inserted into the openings such that the leg portions are positioned on inner surfaces facing each other in a long axis direction of the openings and the leg portions are partially in contact with inner surfaces facing each other in a short axis direction of the openings. An insertion amount of the leg portions into the opening is larger than a sum of a gap between the connection portion and an inner surface of the medium tank and a length from the opening to a position corresponding to a brazed portion between the flat tube and the plate, or when a protruding portion protruding in a direction opposite to an insertion direction of the leg portion is provided in the connection portion, larger than a sum of a gap between the protruding portion and the inner surface of the medium tank and a length from the opening to the position corresponding to the brazed portion.

According to the aspect, in a state in which the leg portions of the reinforcing member are inserted into the openings, since a gap between a tip end of the protruding portion and the inner surface of the tank is formed to be smaller than the insertion amount of the leg portion into the opening, the leg portions do not come out from the openings even when the reinforcing member moves from the opening in the direction opposite to the insertion direction. Therefore, the reinforcing member is prevented from being detached off from the opening. Therefore, in a manufacturing process in which visual confirmation of detachment or the like of the reinforcing member after brazing is not possible, it is possible to improve work reliability without giving special consideration, and it is possible to improve work efficiency and yield in manufacturing the heat exchanger.

DETAILED DESCRIPTION

Hereinafter, embodiments of the present invention will be described with reference to the accompanying drawings.

Figure 1:
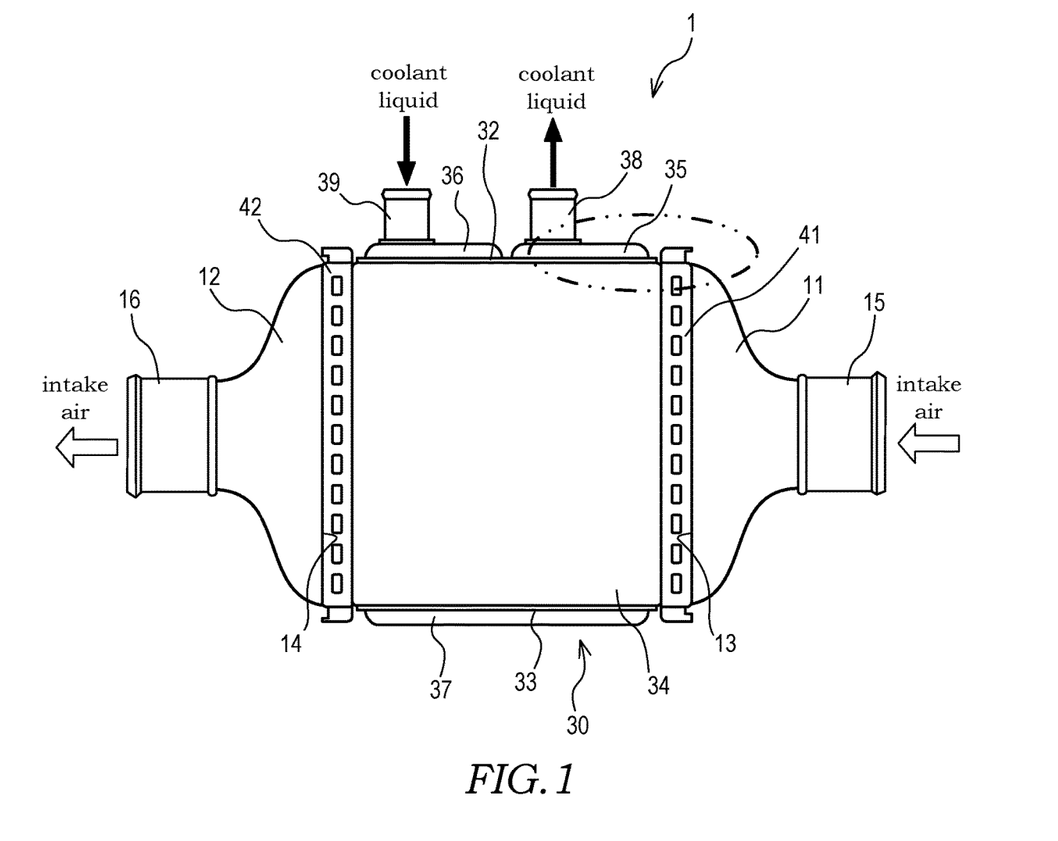
FIG. 1 is a plan view showing a heat exchanger according to an embodiment of the present invention.
Figure 2:
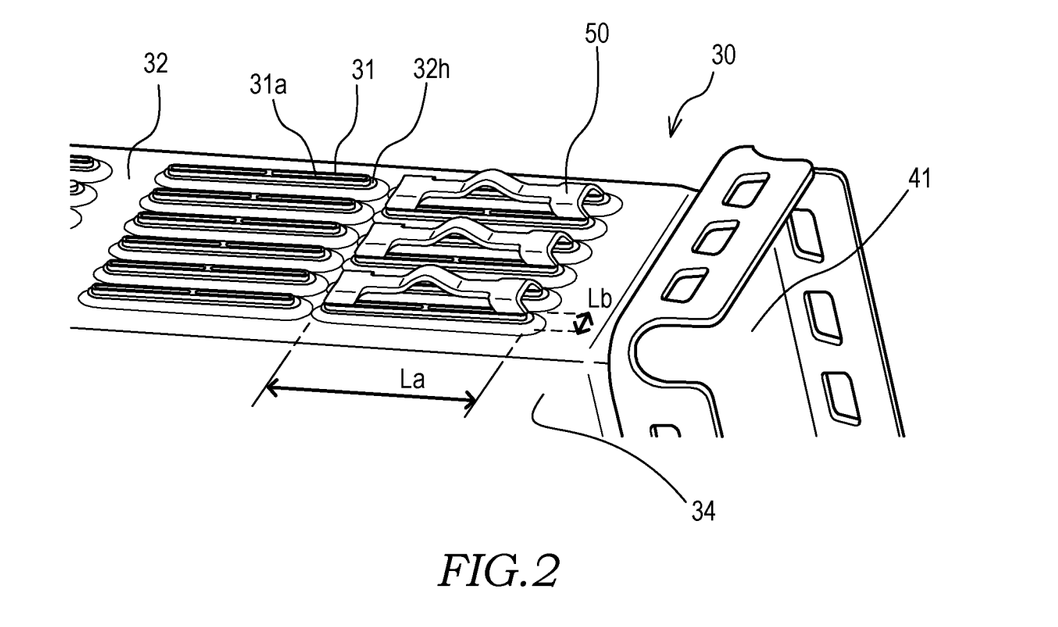
FIG. 2 is a perspective view showing a portion shown by a two-dot chain line in FIG. 1 in an exploded manner.

FIG. 1 is a plan view showing a heat exchanger 1 according to the present embodiment. FIG. 2 is a perspective view showing a portion shown by a two-dot chain line in FIG. 1 in an exploded manner. In order to simplify the description, a part of the heat exchanger 1 is omitted.

The heat exchanger 1 is used as a water-cooling type charge air cooler that cools an intake air (fluid) supercharged to an engine (not shown) with a coolant liquid (medium).

The heat exchanger 1 includes a pair of intake tanks 11 and 12 (flow path members) that guide the intake air, and a core 30 that circulates the coolant liquid. The core 30 is interposed between the pair of intake tanks 11 and 12. The intake air flowing through the core 30 through the intake tanks 11 and 12 is cooled by dissipating heat to the coolant liquid flowing inside the core 30.

The resin intake tanks 11 and 12 have dome-shaped opening end portions 13 and 14 that open toward the core 30, and cylindrical tubular portions 15 and 16 that open toward the opposite side of the core 30. A duct (not shown) is connected to the tubular portions 15 and 16. The intake air flows into the core 30 through one intake tank 11 as indicated by a blank white arrow, circulates around the flat tubes 31 (see FIG. 2) arranged inside the core 30, and then flows out from the other intake tank 12.

The metal core 30 includes a plurality of flat tubes 31 (see FIG. 2) having a flat cross section and forming a medium flow path, plates 32 and 33 to which the plurality of flat tubes 31 are attached, and a plurality of core plates 34 forming an accommodation portion that accommodates the plurality of flat tubes 31 between the plates 32 and 33. In addition, the core 30 includes upper medium tanks 35 and 36 that cover the plate 32 to which the plurality of flat tubes 31 are attached, and a lower medium tank 37 that covers the plate 33. Pipes 38 and 39 are connected to the upper medium tanks 35 and 36, respectively.

As shown in FIG. 2, the plate 32 is attached to end portions of the plurality of flat tubes 31. The plate 32 has a plurality of insertion holes 32h into which the plurality of flat tubes are inserted. The plurality of insertion holes 32h have shapes the same as cross-sectional shapes of the plurality of flat tubes. In FIG. 1, the plate 33 arranged on the lower side of the core 30 is also formed in the same manner as the plate 32.

A frame-shaped plate 41 is bonded to one side of a box body formed by the plates 32 and 33 and the core plates 34. The opening end portion 13 of the intake tank 11 is attached to the plate 41. In addition, similarly, a frame-shaped plate 42 is bonded to the other side of the box body. The opening end portion 14 of the intake tank 12 is attached to the plate 42.

The upper medium tanks 35 and 36 are bonded so as to cover openings 31a of the plurality of flat tubes 31 inserted into the insertion holes 32h on the plate 32. In addition, the lower medium tank 37 is bonded so as to cover the openings 31a of the plurality of flat tubes 31 inserted into the insertion holes (not shown) on the plate 33. Therefore, a medium flow path is formed from the pipe 38 through the flat tube 31, folded back at the lower medium tank 37, and discharged from the pipe 39 through the flat tube 31.

During operation of the engine, as indicated by a black arrow, the coolant liquid sent from a pump (not shown) through a pipe flows into the flat tube 31 through one pipe such as the pipe 38, flows through the medium flow path inside the flat tube 31, and then flows out from the other pipe 39.

As shown in FIG. 2, the openings 31a of the flat tubes 31 inserted into the insertion holes 32h on the plate 32 are provided with reinforcing members 50 for reinforcing the openings 31a.

Figure 3:
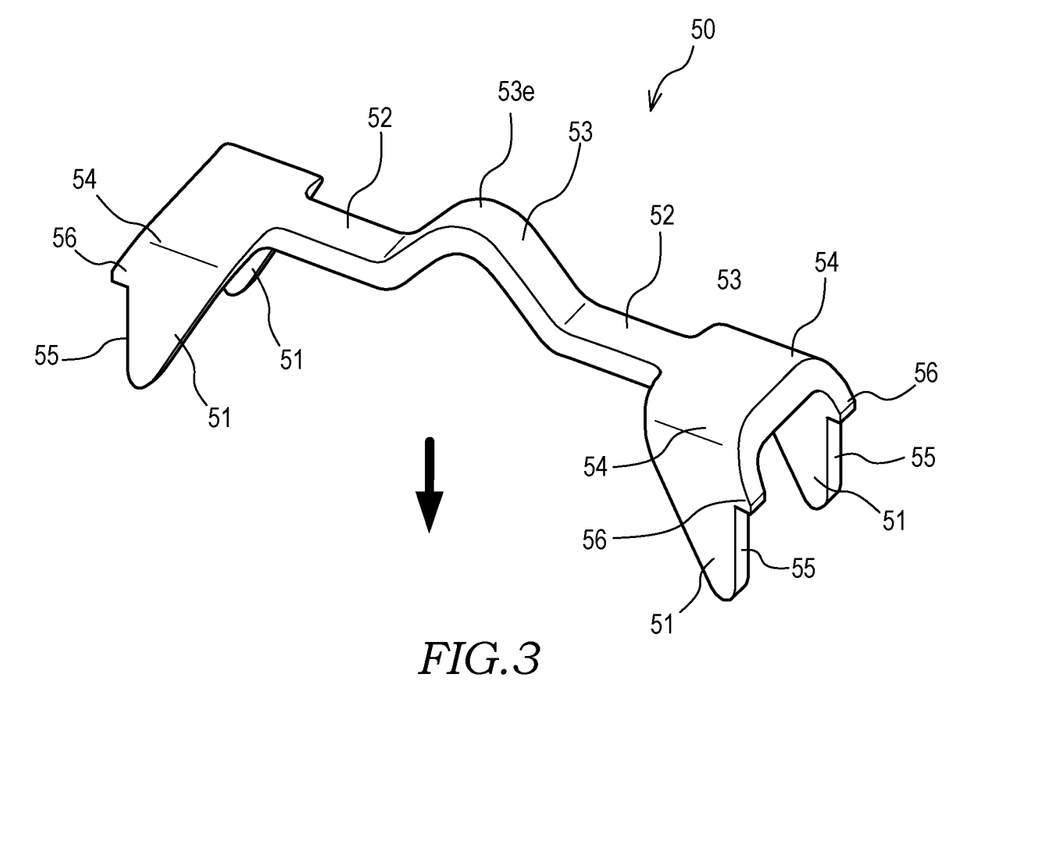
FIG. 3 is a perspective view illustrating a reinforcing member applied to the heat exchanger.
Figure 4:
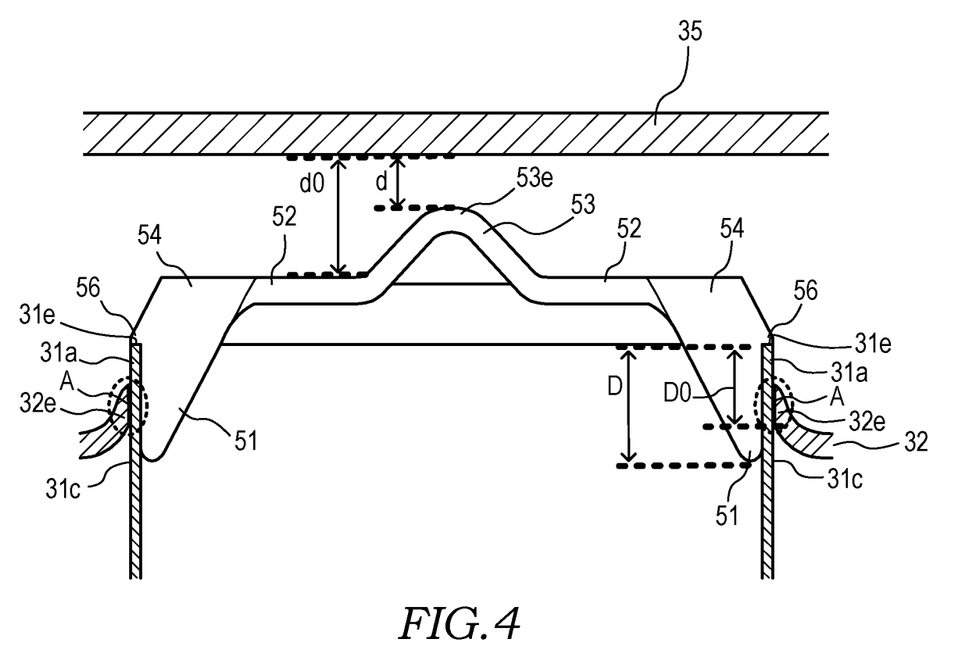
FIG. 4 is a view illustrating a state in which the reinforcing member applied to the heat exchanger is incorporated, and is a cross-sectional view showing a part cut out along an extending direction of a flat tube shown in FIG. 2.

Subsequently, the reinforcing member 50 will be described. FIG. 3 is a perspective view illustrating the reinforcing member 50 applied to the heat exchanger 1. In addition, FIG. 4 is a view illustrating a state in which the reinforcing member 50 is incorporated in the openings 31a of the flat tubes 31, and is a cross-sectional view showing a part cut out along an extending direction of the flat tube 31 shown in FIG. 2.

The reinforcing member 50 has at least a pair of leg portions 51 and a connection portion 52 that connects the leg portions 51. The leg portions 51 are inserted into the openings 31a of the flat tubes 31. In addition, the connection portion 52 connects the leg portions 51 to form a main body portion of the reinforcing member 50.

In addition, the reinforcing member 50 has a protruding portion 53 formed in a part of the connection portion 52 so as to protrude in a direction opposite to the insertion direction of the leg portions 51 into the openings 31a (arrow shown in FIG. 3).

The reinforcing member 50 can be formed by cutting and bending a flat plate. As an example, a material flat plate for forming the reinforcing member 50 is cut out into a substantially H shape in which portions constituting the leg portions 51 extend from both sides of the connection portion 52. After that, the leg portions 51 and the protruding portion 53 can be formed by a bending process. The cutting and the bending may be formed by a single press process.

In the reinforcing member 50 obtained by processing in this way, a bent portion 54 that connects the connection portion 52 and the leg portion 51 is formed. The bent portion 54 connects the connection portion 52 and the leg portion 51, and is processed into a predetermined bending radius R. In addition, the reinforcing member 50 has a straight portion 55 connected to the bent portion 54.

In the present embodiment, as shown in FIG. 2, the pair of leg portions 51 are formed so as to be located on inner surfaces facing each other in a long axis direction (La) of the openings 31a. In addition, a part of each leg portion 51 is inserted into one opening 31a so as to make the pair of the leg portions be in contact with inner surfaces facing each other in a short axis direction (Lb) of the openings 31a.

In the present embodiment, another pair of the leg portions 51 are formed so as to be located on inner surfaces facing each other in the long axis direction of the openings 31a of the other flat tubes 31 arranged in the short axis direction (Lb). That is, in the present embodiment, the reinforcing member 50 includes four leg portions 51.

In the present embodiment, the flat tubes 31, the plates 32 and 33, the core plate 34, the plates 41 and 42, the upper medium tanks 35 and 36, the lower medium tank 37, fins (not shown), the pipes 38 and 39, and the reinforcing members 50 are connected by a brazing material.

In the present embodiment, the reinforcing member 50 is attached across the adjacent flat tubes 31. The protruding portion 53 is located between the openings 31a of the adjacent flat tubes 31.

In addition, in the present embodiment, the reinforcing member 50 is provided in the openings 31a located on an inflow side of a fluid into the upper medium tank 35. In FIG. 2, in order to describe the flat tubes 31 and the insertion holes 32h, some of the reinforcing members 50 are not depicted, but the reinforcing members 50 are also arranged in the openings 31a on the left side in FIG. 2.

In addition, the straight portion 55 of each of the leg portions 51 is formed with a protrusion 56 that protrudes toward an end surface 31e of the opening 31a of the flat tube 31 in a direction intersecting with the insertion direction into the opening 31a.

As shown in FIG. 4, the leg portions 51 are inserted along the inner surface of the flat tube 31 to a position corresponding to a joint portion A (shown by a dotted-line circle in FIG. 4) which is a brazed portion between an outer side 31c of the flat tube 31 and an edge portion 32e of the insertion hole 32h.

In the reinforcing member 50, the protruding portion 53 is formed so as to be located between the leg portions 51 in the long axis direction (La) of the openings 31a.

The reinforcing member 50 is inserted into the openings 31a such that the gap between the connection portion 52 and the inner surface of the upper medium tank 35 is smaller than the insertion amount of the leg portion 51 into the opening 31a. The gap between the connection portion 52 and the inner surface of the upper medium tank 35 is a distance between the connection portion 52 and the inner surface of the upper medium tank 35 in the insertion direction of the reinforcing member 50 into the opening 31a.

In the present embodiment, the reinforcing member 50 is inserted into the openings 31a such that the gap d between the tip end 53e of the protruding portion 53 and the inner surface of the upper medium tank 35 is smaller than the insertion amount D of the leg portion 51 into the opening 31a. That is, the protruding portion 53 is formed so as to satisfy a relationship of d<D.

In addition, the gap d between the tip end 53e of the protruding portion 53 and the inner surface of the upper medium tank 35 is smaller than the gap d0 between the bent portion 54 and the inner surface of the upper medium tank 35.

In addition, in the present embodiment, since the leg portion 51 is reliably inserted into the position corresponding to the joint portion A between the outer side 31c of the flat tube 31 and the edge portion 32e of the insertion hole 32h, the insertion amount D of the leg portion 51 into the opening 31a is larger than a sum of the gap d0 between the connection portion 52 and the inner surface of the upper medium tank 35 and a length D0 from the opening 31a to a lower end portion of the joint portion A which is the brazed portion between the flat tube 31 and the plate 32. Here, the lower end portion is an end portion of the joint portion A located on a central side in the extending direction of the flat tube 31. That is, a relationship of d0+D0<D is satisfied. When the protruding portion 53 is formed, a relationship of d+D0<D is satisfied.

The protruding portion 53 is deformed in the insertion direction when the protruding portion 53 comes into contact with the inner surface of the upper medium tank 35.

In the present embodiment, the heat exchanger 1 is manufactured by assembling the flat tubes 31, the plates 32 and 33, the core plate 34, the plates 41 and 42, the upper medium tanks 35 and 36, the lower medium tank 37, the fins (not shown), the pipes 38 and 39, and the reinforcing members 50, and then heating and brazing.

Any of the inside of the flat tube 31, the inside of the upper medium tanks 35 and 36, and the reinforcing member 50 may be formed from a material free of brazing material layer.

In the heat exchanger 1 according to the present embodiment, the reinforcing member 50 of the above configuration is formed of a brazing sheet having brazing material layers clad on both surfaces. In addition, a brazing material layer is clad on the outer side of the flat tube 31, but is not clad on the inner side of the flat tube 31. In addition, a brazing material layer is not clad on the inner sides of the upper medium tanks 35 and 36. In addition, brazing material layers are clad on both surfaces of the plate 32. Therefore, after assembling each configuration, the entire heat exchanger 1 is placed in a furnace set to a predetermined temperature, so that each configuration can be integrally brazed and fixed.

<Function and Effect>

In the heat exchanger 1 according to the present embodiment, the reinforcing member 50 for reinforcing the openings 31a of the flat tubes 31 is formed such that the gap d between the tip end 53e of the protruding portion 53 and the inner surface of the upper medium tank 35 is smaller than the insertion amount D of the leg portion 51 into the opening 31a in a state in which the leg portion 51 is inserted into the opening 31a (that is, d<D).

Therefore, even when the leg portions 51 of the reinforcing member 50 move in the direction opposite to the insertion direction from the openings 31a of the flat tubes 31, the tip end 53e of the protruding portion 53 comes into contact with the inner side of the upper medium tank 35 before the leg portions 51 come out of the openings 31a. Therefore, the reinforcing member 50 is prevented from being detached off from the openings 31a of the flat tubes 31. Therefore, no special consideration is required in the manufacturing process of the heat exchanger 1. Therefore, it is possible to improve work efficiency and yield in manufacturing the heat exchanger 1.

The heat exchanger 1 having such a configuration can suitably apply a fixing method such as brazing, which is difficult to disassemble and redo after assembling each configuration.

A pair of the four leg portions 51 provided in the reinforcing member 50 are located on the inner surfaces facing each other in the long axis direction (La) of the openings 31a, and the other pair of leg portions 51 are located on the inner surfaces facing each other in the long axis direction of the openings 31a of the adjacent flat tubes 31 arranged in the short axis direction (Lb). That is, in the present embodiment, the reinforcing member 50 is attached across the adjacent flat tubes 31, and the protruding portion 53 in the reinforcing member 50 is located between the openings 31a of the adjacent flat tubes 31.

With such a configuration, the reinforcing member 50 does not interfere with the flow of the coolant liquid (medium) flowing into the openings 31a of the flat tubes 31.

In addition, the protrusion 56 is formed on the straight portion 55 of the leg portion 51. When the end surface 31e of the opening 31a reaches the bent portion 54 of the reinforcing member 50, it is assumed that unnecessary stress is applied to the leg portions of the reinforcing member 50 to push and make the adjacent flat tubes 3 1expanded in a direction away from each other.

On the other hand, in the present embodiment, since the straight portion 55 is provided with the protrusion 56, the leg portion 51 is restricted by the protrusion 56 when the leg portion 51 is inserted into the opening 31a. Therefore, the leg portion 51 does not enter the flat tube 31 too much. Therefore, the reinforcing member 50 can reinforce the flat tubes 31 and prevent the flat tubes 31 from being deformed.

In addition, in the reinforcing member 50, the protruding portion 53 is formed so as to be located at the central portion of the connection portion 52 that connects the leg portions 51 in the long axis direction (La) of the openings 31a. Therefore, when the leg portions 51 of the reinforcing member 50 move from the openings 31a of the flat tubes 31 in the direction opposite to the insertion direction, an effect of restricting the position of the reinforcing member 50 can be easily obtained.

In addition, even if a tolerance in the molding dimensions is included in each of the reinforcing members 50, since the protruding portion 53 comes into contact with the inner surface of the upper medium tank 35 when the upper medium tank 35 is assembled, an effect of restricting the leg portions 51 of the reinforcing member 50 so as not to move in the direction opposite to the insertion direction from the openings 31a of the flat tubes 31 can be easily obtained.

In addition, since the protruding portion 53 comes into contact with the inner side of the upper medium tank 35 and is deformed in the insertion direction, the upper medium tank 35 is not prevented from being fitted into the plate 32 in a state in which the upper medium tank 35 is assembled to the plate 32.

In addition, when the protruding portion 53 comes into contact with the inner side of the upper medium tank 35 and is deformed in the insertion direction, the connection portion 52 on which the protruding portion 53 is formed is deformed toward the inner side of the flat tube 31. Therefore, when the protruding portion 53 comes into contact with the inner side of the upper medium tank 35, the leg portion 51 can absorb the stress acting in the direction in which the end surface 31e of the opening 31a of the flat tube 31 is pushed and expanded outward. Therefore, the reinforcing member 50 can reinforce the flat tubes 31 while preventing the flat tubes 31 from being deformed.

In addition, in the present embodiment, the reinforcing member 50 is arranged at the opening 31a located on the side closest to the intake tank 11, that is, at a position where the flat tube 31 is susceptible to thermal strain. Therefore, a reinforcing effect on accumulation of the thermal strain of the flat tube 31 can be enhanced.

In addition, in the heat exchanger 1 according to the present embodiment, the reinforcing member 50 and the plate 32 are formed of a brazing sheet in which the brazing material layers are clad on both surfaces, the flat tube 31 is formed of a brazing sheet in which the brazing material layer is clad only on one surface (outer side of the tube), and the inner sides of the upper medium tanks 35 and 36 are not clad with a brazing material layer.

Therefore, the bonding of the flat tube 31 and the plate 32 is performed by using the outer surface brazing material of the flat tube 31 and the brazing material of the plate 32, the bonding of the plate 32 and the upper medium tank 35 is performed by using the brazing material of the plate 32, and the bonding of the flat tube 31 and the reinforcing member 50 is performed by using the brazing material of the reinforcing member. For example, even when the reinforcing member 50 is slightly misaligned and comes into contact with the inner side of the upper medium tank 35 or the like, since a brazing material layer is not provided inside the upper medium tank 35, the excessive brazing material does not flow into the flat tube 31. In addition, it is possible to prevent a decrease in a durability of the heat exchanger 1 due to partial thickness reduction or the like that may occur due to an excessive amount of brazing material. As a comparative example, when the brazing material for bonding the plate 32 is provided on the inner surface of the upper medium tank 35, the reinforcing member 50 is misaligned and comes into contact with the upper medium tank, the brazing material of the reinforcing member serves as a bridge, and the brazing material flows into the tube, resulting in excessive brazing material.

Other Embodiments

Although the embodiments of the present invention have been described above, the above-mentioned embodiments are merely a part of application examples of the present invention, and do not mean that the technical scope of the present invention is limited to the specific configurations of the above-mentioned embodiments.

A shape of the protruding portion 53 is not limited as long as the protruding portion 53 is formed such that the gap d between the tip end 53e of the protruding portion 53 and the inner surface of the upper medium tank 35 is smaller than the insertion amount D of the leg portion 51 into the opening 31a in a state in which the leg portion 51 is inserted into the opening 31a. The shape of the protruding portion 53 may be formed as a flat surface instead of the tip end 53e. In addition, the protruding portion 53 is not limited to one peak. For example, the protruding portion 53 may have two peaks.

In addition, the embodiments of the present invention can also be applied not only to the water-cooled type charge air cooler but also to other heat exchangers.

The invention claimed is:

1. A heat exchanger, comprising:
   a plurality of flat tubes configured to form a medium flow path;
   a plate attached to an end portion of each of the plurality of flat tubes, the plate having a plurality of insertion holes into which the plurality of flat tubes are inserted, the plurality of insertion holes having shapes the same as cross-sectional shapes of the plurality of flat tubes;
   a medium tank configured to form a medium flow path by covering openings of the plurality of flat tubes inserted into the insertion holes; and
   a reinforcing member configured to reinforce the openings, wherein
   the plurality of flat tubes, the plate, the medium tank, and the reinforcing member are connected by a brazing material,
   the reinforcing member includes at least a pair of leg portions and a connection portion that connects the leg portions, the leg portions being positioned on inner surfaces facing each other in a long axis direction of the openings, and a part of the leg portions being inserted into the openings so as to be in contact with the inner surfaces facing each other in a short axis direction of the openings, and
   an insertion amount of the leg portions into the opening is larger than a sum of a gap between the connection portion and an inner surface of the medium tank and a length from the opening to a position corresponding to a brazed portion between the flat tube and the plate.

2. The heat exchanger according to claim 1, wherein the reinforcing member has a bent portion that connects the connection portion and the leg portions.

3. A method for manufacturing the heat exchanger according to claim 1, comprising:
   forming any of inner sides of the flat tubes, an inner side of the medium tank, or the reinforcing member from a material free of brazing material layer;
   assembling the flat tubes, the plate, the medium tank, and the reinforcing member; and
   performing heat brazing after the assembly.

4. The method for manufacturing the heat exchanger according to claim 3, further comprising:
   forming the inner side of the flat tube and the inner side of the medium tank from a material free of brazing material layer; and
   forming the reinforcing member and the plate from a material having brazing material layers formed on both surfaces.

5. A heat exchanger, comprising:
   a plurality of flat tubes configured to form a medium flow path;
   a plate attached to an end portion of each of the plurality of flat tubes, the plate having a plurality of insertion holes into which the plurality of flat tubes are inserted, the plurality of insertion holes having shapes the same as cross-sectional shapes of the plurality of flat tubes;
   a medium tank configured to form a medium flow path by covering openings of the plurality of flat tubes inserted into the insertion holes; and
   a reinforcing member configured to reinforce the openings, wherein the plurality of flat tubes, the plate, the medium tank, and the reinforcing member are connected by a brazing material, and the reinforcing member includes at least a pair of leg portions and a connection portion that connects the leg portions, the leg portions being positioned on inner surfaces facing each other in a long axis direction of the openings, and a part of the leg portions being inserted into the openings so as to be in contact with the inner surfaces facing each other in a short axis direction of the openings, the heat exchanger further comprising:

a protruding portion protruding in a direction opposite to an insertion direction of the leg portion in the connection portion, wherein an insertion amount of the leg portions into the opening is larger than a sum of a gap between the protruding portion and an inner surface of the medium tank and a length from the opening to a position corresponding to a brazed portion.

6. The heat exchanger according to claim 5, wherein the reinforcing member has a bent portion that connects the connection portion and the leg portions, and the gap between the protruding portion and the inner surface of the medium tank is smaller than a gap between the bent portion and the inner surface of the medium tank.

7. A method for manufacturing the heat exchanger according to claim 5, comprising:

forming any of inner sides of the flat tubes, an inner side of the medium tank, or the reinforcing member from a material free of a brazing material layer;

assembling the flat tubes, the plate, the medium tank, and the reinforcing member; and performing heat brazing after the assembly.

* * * * *